United States Patent
Dettinger et al.

(10) Patent No.: US 7,437,760 B2
(45) Date of Patent: Oct. 14, 2008

(54) ANTIVIRAL NETWORK SYSTEM

(75) Inventors: Richard Dean Dettinger, Rochester, MN (US); Frederick Allyn Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 10/268,421

(22) Filed: Oct. 10, 2002

(65) Prior Publication Data

US 2004/0073810 A1   Apr. 15, 2004

(51) Int. Cl.
  *G06F 21/24* (2006.01)
  *G06F 21/00* (2006.01)

(52) U.S. Cl. .............................. 726/24; 726/22; 726/25; 726/30; 713/150; 713/161; 713/169

(58) Field of Classification Search .................... 726/22, 726/24–25; 713/188
  See application file for complete search history.

(56) References Cited

U.S. PATENT DOCUMENTS

| | | | |
|---|---|---|---|
| 6,088,803 A | 7/2000 | Tso et al. | |
| 6,275,937 B1 | 8/2001 | Hailpern et al. | |
| 7,010,696 B1* | 3/2006 | Cambridge et al. | 713/188 |
| 7,143,109 B2* | 11/2006 | Nagral et al. | 707/104.1 |
| 7,237,267 B2* | 6/2007 | Rayes et al. | 726/25 |
| 7,257,630 B2* | 8/2007 | Cole et al. | 709/224 |
| 7,343,624 B1* | 3/2008 | Rihn et al. | 726/24 |
| 2003/0023866 A1* | 1/2003 | Hinchliffe et al. | 713/200 |
| 2003/0154393 A1* | 8/2003 | Young | 713/200 |
| 2004/0049698 A1* | 3/2004 | Ott et al. | 713/201 |

FOREIGN PATENT DOCUMENTS

CN   1068205 A   1/1993

OTHER PUBLICATIONS

Draper, D.; HaLevy, A.Y.; Weld, D.S.; "The Nimble XML data integration system" Data Engineering, 2001. Proceedings. 17th International Conference on; Apr. 2-6, 2001 pp. 155-160.*
http://help.msn.com/!data/en  us/data/hotmailv4.its51/$content$WHATMCFEE.HTM?H..., "What is McAfee VirusScan?" p. 1, printed Apr. 12, 2002.
http://lwllfd.lawll.hotmail.msn.com/cgi-bin/getmst?curmbox=F000000001&a=c35a1443..., "Hotmail Message," p. 1, printed Apr. 12, 2002.

* cited by examiner

*Primary Examiner*—Syed A. Zia
(74) *Attorney, Agent, or Firm*—Wood, Herron & Evans, LLP

(57) ABSTRACT

A method, apparatus and program product initiate generation of a metafile at a client computer. The metafile is evaluated at a network server for a potential viral risk. Program code executing at the server may correlate the evaluated potential risk to a risk level stored in a database. The program code may attach a color designator or other assignment indicative of the assessed risk level to the data. A user at the client computer may act on the data based on the attached risk level.

15 Claims, 4 Drawing Sheets

ANTIVIRAL NETWORK SYSTEM

FIELD OF THE INVENTION

The present invention relates generally to computer operations and applications, and more particularly, to safeguarding network resources against computer viruses.

BACKGROUND OF THE INVENTION

Computer viruses reek havoc on government and industry computer networks. A virus may include a parasitic program written intentionally to infiltrate a computer system without user permission, and in some cases, knowledge. A virus as described in this application may also include a "worm," "Trojan horse" and other vernacular known within the computer community and associated with software configured to degrade system operation. The term, "virus," may also include less frequent, unintentional programming aberrations that can occur in the course of normal processing operations. Although the operation and characteristics of viruses often vary by design, some commonalities persist. For instance, many viruses attach themselves to a file, others may infect a boot sector, and some can replicate themselves, compounding their detrimental impact.

In this manner, viruses can cause serious damage to networks and negatively affect system performance. For instance, a worm program virus may automatically propagate to every disk in contact with a given hard drive. Another or the same virus may replicate itself in program memory until it overburdens a processor and brings an associated system down. Viruses may rapidly infiltrate and infect systems via electronic mail, as well as from downloading operations involving diskettes, user directories, the Internet and other network interfaces.

To this end, computer systems conventionally rely on antiviral software attendant at each user computer of a network. A network administrator or user may individually download or otherwise install such programs onto each computer. Dependant upon In operation, conventional antiviral programs monitor data incoming to a user computer for characteristics indicative of a virus. Such characteristics may include known data patterns, such as an identifiable code sequence commonly used in replication functions. The software may additionally or alternatively scan how incoming data attaches to electronic transmissions (e.g. electronic mail), as well as unusual errors occurring within the operating system. Still other exemplary antiviral programs detect unexplainable memory allotments and irregular file names, among other indicators. In response to detecting a potentially infected data file, the antiviral program may sequester the data, warn the user, and/or otherwise flag the data.

Despite provisions afforded by conventional antiviral programs, viral occurrences persist. In part, such infestation is attributable to the evolving nature of viruses. Designers of viruses constantly modify and create new program code configured to elude antiviral programs and configurations. As a consequence, an effective antiviral programmer must continually attempt to anticipate new viruses by updating and refocusing protective code on different data strings and code indicators. Because code embodying viral patterns are subject to constant change, such a task often presents a losing proposition.

In other instances, an antiviral program may flag legitimate program code that it mistakes for a virus. Such misidentification is at least in part a product of network terrorists' attempts to conceal viruses by imparting to their viruses legitimate code and other attributes to give them the appearance of a conforming, benign transmission. In any case, antiviral programs/precautions directed to these "Trojan horse" viruses can actually result in processing delays and data losses that prove detrimental to system operation even in the absence of a real viral threat.

Another obstacle plaguing efforts to recognize and confine viruses regards the localized nature of antiviral program implementations. Conventional antiviral applications can typically only affect those files received at the local computer or server at which the antiviral application is executing. For instance, the scope of server-based antiviral software is limited to only that data that passes through the particular server. Thus, other computers within the same network remain susceptible to simultaneous or subsequent occurrences of a virus.

Moreover, updating antiviral software at each user computer of a network can be time consuming and even complicated for personnel. For instance, it may take several hours for a new program to download properly from a server to a user computer. Such demands often pose an inconvenience to users and result in a reluctance to keep antiviral software updated. As such upgrades may be incumbent upon the individual users, certain computers within the network may remain vulnerable to viral attack. As such, viruses often propagate throughout an entire network before they can be quarantined and evaluated. Thus, the uncoordinated and decentralized practice of detecting viruses at each individual user computer can frustrate efforts to track, stymie and study viruses.

Consequently, and for in part the above delineated reasons, there exists a need for an improved manner of monitoring computer networks for viral and other disruptive occurrences.

SUMMARY OF THE INVENTION

The present invention provides an improved apparatus, method and program product for detecting the presence of a computer virus. In one respect, embodiments of the present invention capitalize on a joint client-server relationship to identify and contain computer viruses. More particularly, a server component of a joint server-client configuration consistent with the invention may receive a metafile associated with the data to be evaluated. Notably, the metafile may be generated at the client computer where it is received. Received data may be cached at the client computer while evaluation processes occur at the server. As such, program code at the server may evaluate the metafile for viral potential while the actual data remains contained remotely at the client computer. Where so configured, the server computer may determine the viral potential of the received data by evaluating the relatively small amount of data comprising the metafile. This feature may allow the evaluation at the server to be accomplished with relative ease and speed, while still confining a potential virus to the local client computer.

The client computer may initially generate the metafile by sampling one or more preselected parameters from the locally received data. These parameters may be generally indicative of a viral presence. For instance, the program code at the client computer may generate the metafile by sampling the data received therein for parameters relating to code sequences, processing requirements, routing path, file size and attachments, among other considerations correlative to known viruses. The metafile may thus embody key viral characteristics of the data received at the client computer. Moreover, the quantity and type of information sampled from the arriving data may be tailored according to application, security and other network specifications.

Because the metafile typically does not include all of the material contained in the data arriving at the client computer, transmission and processing of the relatively "lightweight" metafile may be fast and efficient. Viral indicators or other content present in the metafile may nonetheless be indicative of a potential viral risk associated with the data received at the client computer. In one embodiment, program code may match or otherwise correlate the content of the metafile to database fields containing evaluative criteria. Exemplary criteria may be directed to viral and user profiles, e.g., code sequences, conspicuous misspellings, as well as historical, network and contextual information suited for viral evaluation. Results of the correlation may include a determination of links to other database fields containing viral assessments.

Should the evaluation conducted at the server determine the possibility of a virus via a retrieved viral assessment, for instance, the program code executing on the server may initiate an antiviral operation for the data contained at the client computer. More specifically, database fields may correlate a stored, antiviral operation to the metafile content and/or evaluative criteria as determined by the server computer. One such operation may include an algorithm configured to prevent further propagation of the data throughout the network. Another or the same algorithm consistent with an embodiment of the invention may generate a warning message that is transmitted to the user at the client computer. As such, the local user at the client computer may take action with regard to the data in view of an assigned risk level or other evaluation communicated from the server computer. Still other algorithms consistent with the invention may reroute or modify the data from its original state.

In this manner, the suspect data may be prohibited from infecting other user computers tied into the network. The centralized configuration of a server computer consistent with the principles of the present invention may further translate into early containment of viruses by, in part, ensuring that all data is evaluated by the most up-to-date antiviral programs. Such programs may execute on the centrally located and readily updated server(s) at which all respective metafiles may be evaluated.

By virtue of the foregoing there is thus provided an improved antiviral mechanism that minimizes harm caused by viral infections in a manner that addresses above-identified shortcomings of known networked systems. These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF DRAWINGS

Figure 1:
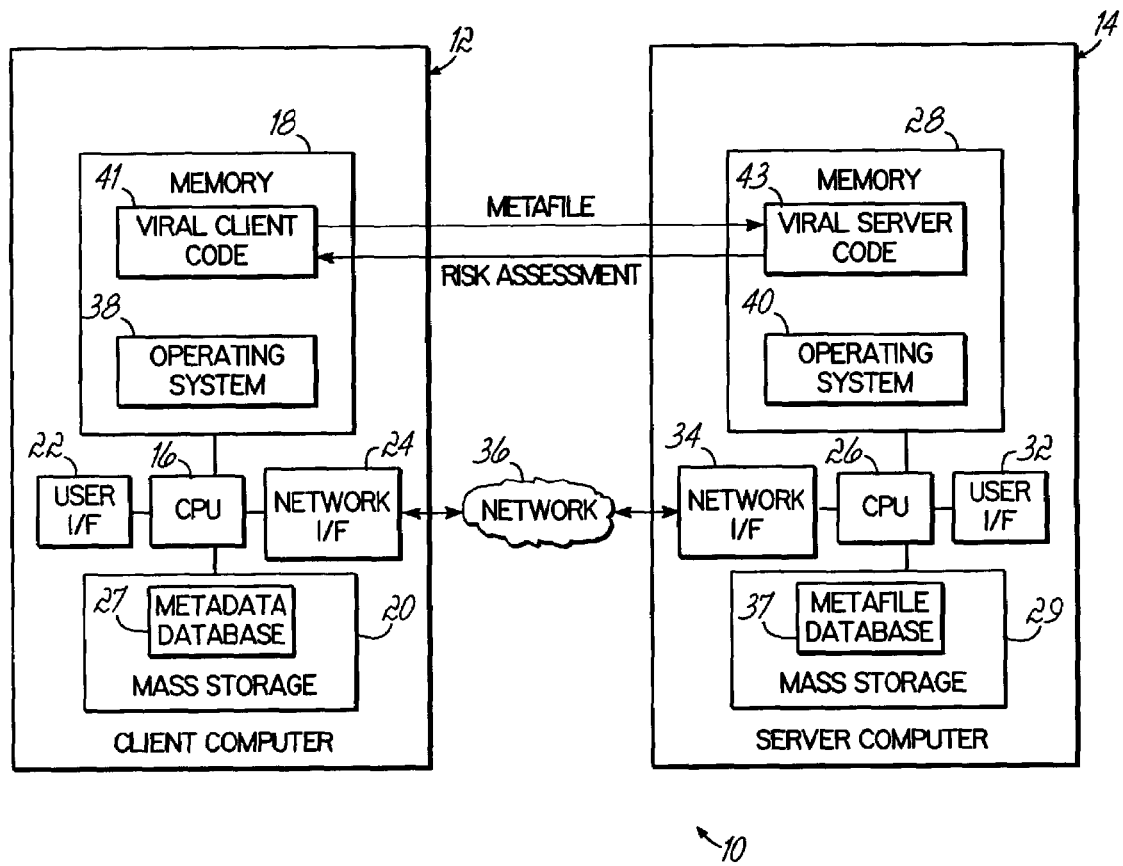
FIG. 1 is a block diagram of a client-server computer system incorporating antiviral software consistent with the invention.

Turning now to the Drawings, wherein like numbers denote like parts throughout the several views, FIG. 1 illustrates a client-server based computer system 10 configured to detect viruses within a network 36. In the illustrated embodiment, the system 10 may evaluate at a server computer 14 a metafile derived from data received at a client computer 12. Based upon the evaluation of the metafile, the server computer 14 reports a determined viral risk potential back to the client computer 20 for appropriate action. In operation, the client computer 12 of the system 10 may receive or otherwise access data. Program code 41 resident on the client computer 12 may generate a metafile containing information indicative of the presence of and/or potential for a virus in the received data. An exemplary metafile may be derived from information that directly or contextually regards an actual data transmission and/or file, and may generally comprise any metadata. Where desired, the metafile may be subsequently routed within the network 36 to additional servers configured for further evaluation. Such evaluation may include the assignment of a color or other indicator to the data that is configured to communicate a level of risk associated with the data to a user. Thus, the risk assignment may act to prompt a user at the client computer 12 to take an appropriate action, such as deleting, reading or re-routing evaluated data.

System 10 includes at least one apparatus, e.g., one or more client computers 12 and one or more server computers 14. For the purposes of the invention, each computer 12, 14 may represent practically any type of computer, computer system or other programmable electronic device capable of functioning as a client and/or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14.

Computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, mass storage 29, user interface 32 and network interface 34. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. For instance, memory 20, 29 of one system 10 consistent with the invention may include respective databases 27, 37 configured to facilitate evaluation of viruses. However, one skilled in the art will appreciate that other hardware environments are contemplated within the context of the invention.

Computers 12, 14 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet.

Each computer 12, 14 operates under the control of an operating system 38, 40 and executes or otherwise relies upon various computer software applications, components, programs, objects, modules, data structures, etc. Moreover, various applications, components, programs, objects, modules, etc. may also execute on one or more processors in another computer coupled to computer 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. For instance, the embodiment of FIG. 1 includes viral client program code 41 configured to generate a metafile, which may comprise any meta data for purposes of the embodiment. On the server 14 side, viral server program code 43 may be configured to evaluate the metadata and produce a risk assessment, as discussed below in greater detail.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, magnetic tape, optical disks (e.g., CD-ROMs, DVDs, etc.), among others, and transmission type media such as digital and analog communication links. Moreover, it should be understood that program code associated with embodiments of the present invention may have application as an integral part of a program package, such as a plug-in program complementing email readers, instant messaging and other receive/run programs.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
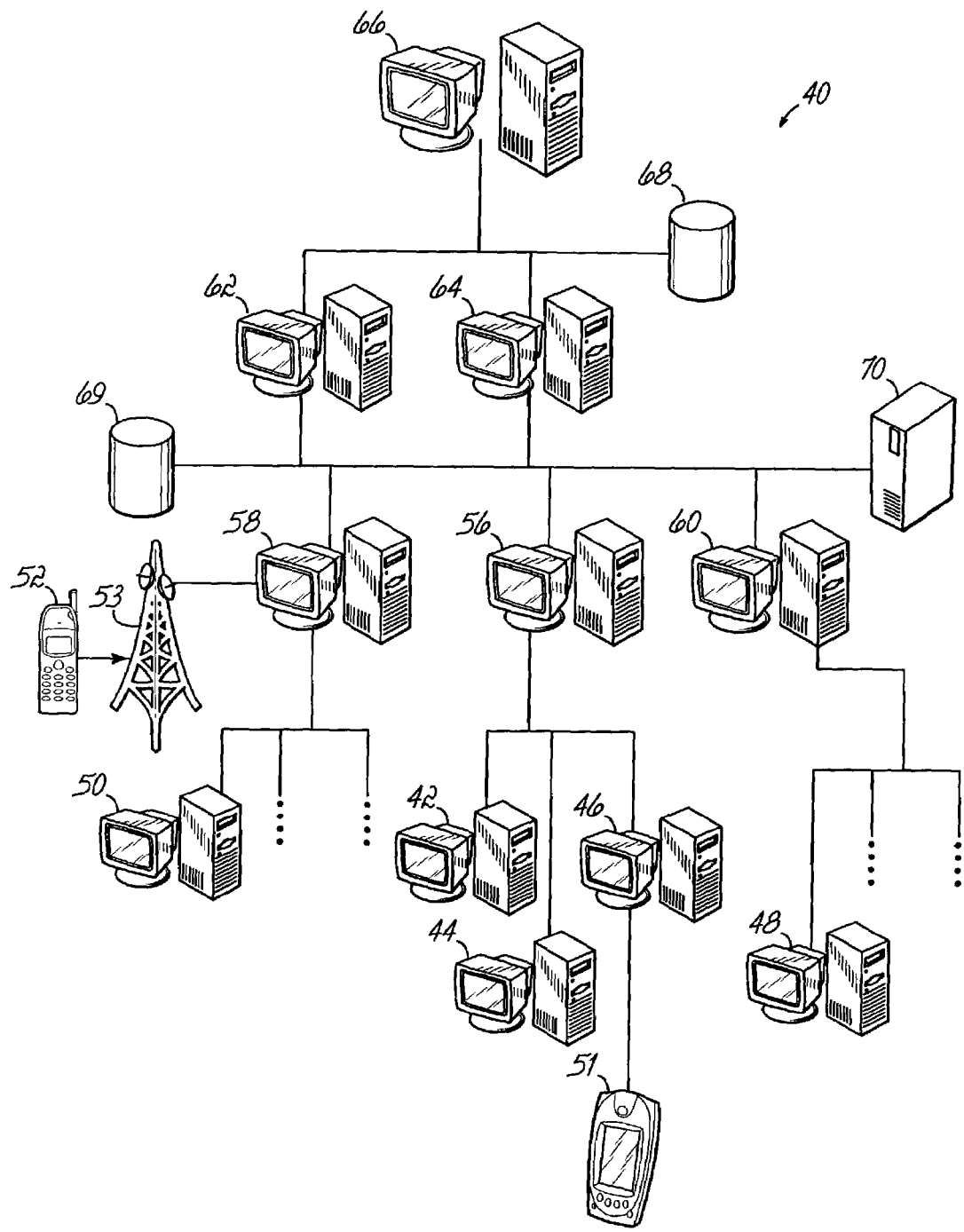
FIG. 2 is a block diagram of a networked communication system capable of implementing the client-server computer system of FIG. 1 consistent with the invention.

FIG. 2 shows another networked system 40 that is consistent with the principles of the present invention. As with the system 10 of FIG. 1, the system 40 of FIG. 2 is, in one respect, configured to generate metafiles at a first computer/controller 42-52; the metafiles being suited for viral evaluation at a second computer 56-66. A typical metafile may be derived from data received or retrieved at the client computer level. Information conveyed within the metafile may be indicative of the presence or potential for a virus. Of note, exemplary controller devices 42-52 comprising the client level in FIG. 2 include, but are not limited to, computers 42-50, as well as electronic organizer 51 and telephonic devices 52. One skilled in the art will appreciate, however, that any number of other devices capable of receiving and reading electronic data could be substituted in accordance with the principles of the present invention for any one of the illustrated controllers 42-52. Moreover, the type of data that is sampled from the received data and recorded within the metafile may vary per platform and application. For example, certain embodiments may construct an exemplary metafile from information that directly or contextually regards an actual data transmission and/or file. As such, an exemplary metafile may include all or a portion of the code comprising the data.

Alternatively or in addition, an exemplary metafile may include information that regards circumstances of the data's transmission, attachment to a file, routed path of entry into the networked system 40, originator, recipient and processor requirements, among other metrics. As such, an exemplary metafile may relate information pertaining to any combination of: transmission parameters, user profile data, download mechanisms, processing requirements, time criteria, sender attributes, receiver attributes, hardware utilized, routing path, originator data, distribution count, user history, data pattern, checksum value, data analysis, attachment, number sent, file size, format and protocol relating to a transmission. The metafile contents may be skewed towards one or more peculiar circumstances that indicate or often accompany a virus. Of note, the metafile is typically formatted at the client computer 42 in accordance with server 56 protocol to facilitate subsequent processing. However, in certain embodiments the metafile may have no required structure. Conversely, program code 43 at the server 56 may be configured to process particularly formatted fields of the metafile.

In one embodiment, the metafile may be generated in response to the electronic receipt, download or other process accompanying entry of data into a client computer 42 and/or network system 40. Another or the same embodiment may initiate metafile generation in response to direct user input, processor utilization or virtually any other registerable or preset condition. As such, the conditions for initiating program code 41 may be preset to match viral operating profiles. A client or a network administrator may specify those data fields or other information relating to a data transmission that will be used by the program code 41 to generate the metafile. Viral indicators populating a metafile typically include those characteristics that commonly accompany viral activity, such as peculiar spellings, known code patterns and dispersion patterns. In any case, program code 41 executing on the local client computer 42 may direct the local computer 42 to sample those fields/portions of the data designated for inclusion in the metafile. Of note, while program code 41 of one embodiment may universally include the same field of each received message within all respective metafiles, program code 41of another embodiment may be more discriminating, including within a metafile only those fields having certain detected content.

Figure 3:
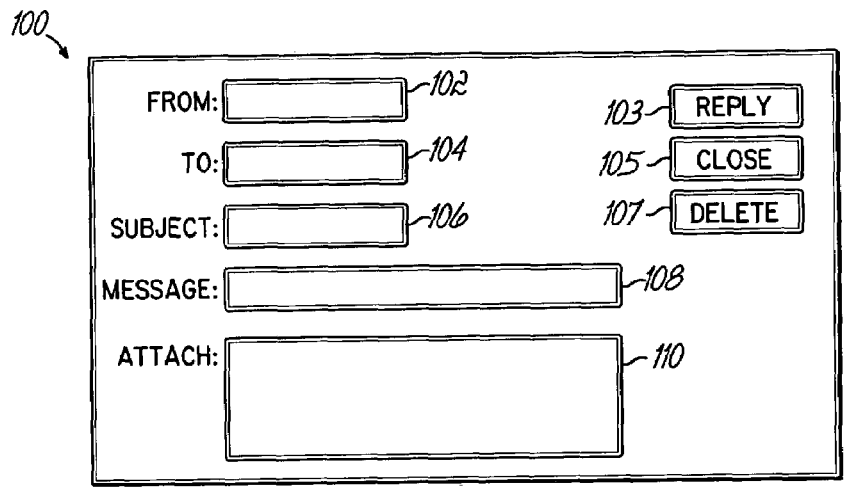
FIG. 3 is an electronic mail template having application within the systems of FIGS. 1 and 2.

One application of the system 40 shown in FIG. 2 may include program code 41 configured to sample fields of an electronic mail transmission. Such fields 102-110 are illustrated in the generic electronic mail transmission interface 100 of FIG. 3. Under certain circumstances, the content of the fields 102-110 may contain information that is (with some measure of statistical probability) indicative the presence of, or potential for a virus. For instance, the presence of an attachment as indicated in field 110 of a message may statistically translate into an increased likelihood that a virus accompanies the transmission.

Thus, program code 41 of one embodiment may be configured to sample information from the attachment field 110 for inclusion in the metafile. Similarly, other fields 102-108 of the exemplary interface 100 may be sampled and included within a metafile. Of note, program code 41, 43 may include commercially available software configured to detect misspellings, as well as antiviral software useful in identifying suspect code sequences or other viral indicators. As such, a metafile of one embodiment may be populated with viral indicators extracted from fields 102-110 having information that has been identified at the client computer 42. Another embodiment may unilaterally record all data relating to a designated field(s) 102 as messages arrive at the client computer 42, leaving more discerning analysis for program code 43 executing on other servers 62-66.

In one example, a client computer 42 may identify that an electronic mail has been routed through more than five servers prior to arriving within the system 40 at the client computer 42. This indicator may be included in a metafile that is routed to a first level server 56. Such first level servers 56-60 may be positioned to service groups of computers 42-50, and may, for instance, correspond to departmental resources within a corporate organization. One of the servers 56 may receive the metafile and execute program code 43 configured to check the routing history of the associated transmission. The results of such analysis may then be included within the same or a second metafile that is routed to a next level server 62 for further analysis. Such analysis may include a final programmatic or administrative determination concerning the risk posed by the message. The evaluation may also include an assignment to the message of a tag or other designator that is indicative of the risk level. For instance, program code 43 on the server 56 may attach a color designator to the data, visually indicating a risk level associated with the evaluated metafile.

Of note, the level of detail sampled by the program code 41 and included within a metafile may vary as a product of both system 40 security requirements and available processing power. For instance, a telephone processor 52 may execute program code 41 that merely records the fact that a message includes an attachment. Where the full computing resources of a client station 42 alternatively executes the program code 41, one skilled in the art will appreciate that more detailed viral indicators may populate metafiles where desired. For instance, one embodiment may sample the entire textual content of an electronic mail message. Another embodiment may record the name and size of the attachment within the metafile for evaluation at the server(s) 56-66 of FIG. 2. An attachment name ending in ".exe" may have different significance than one ending in ".doc." Similarly, the size of the attachment may reflect viral potential in certain applications. Consequently, the size and name of attachments may comprise viral indicators in metafiles of certain embodiments.

A client computer 42 may subsequently transfer a metafile to a network server 56 for viral evaluation. As such, the metafile may be routed to program code 43 resident at the server 56, irrespective of its point of entry within the network 40. The program code 43 may evaluate the information conveyed in the file in the context of criteria indicative of a virus and retrievable from a database 68. Of note, the term "server" for purposes of this embodiment may represent multiple servers 56-66 configured to process information contained within respective metafiles. Moreover, for purposes of an embodiment of the intention, a server may include a desktop/laptop computer, commercial mail hub 70 and/or virtually any processor configured to route electronic transmissions.

Where desired, some embodiments may incorporate multiple servers 56-66 configured to sequentially evaluate viral indicators and/or assign a risk level to the data. Such servers 56-66 may be tiered to accommodate different evaluative functions. For instance, a first server 56 may be configured to evaluate only certain fields of a metafile, and pass on portions of a metafile having other, designated indicators to a second server 62 configured to evaluate only those designated indicators.

The second server 62 may be hierarchically arranged such that it facilitates evaluation of the outstanding indicator prior to passing the metafile back to the first 56 or another server 66 for further evaluation. For instance, the first server 56 may evaluate a metafile having viral indicator fields correlated to the title line of a received electronic mail message. The metafile may also contain a field indicative of an attachment having a peculiar misspelling. In one embodiment, the first server 56 may route the metafile to a next tiered server 62 and/or 66 so that the attachment field may be evaluated against a more comprehensive or application-specific database 68. Another embodiment may route the metafile to administrative personnel.

As discussed below in greater detail, such a server arrangement may facilitate coordinated, centralized detection and address of potential viruses. Of note, electronic transmissions arriving within the system 40 at a server/mail hub 70, in addition to those arriving at client computer 42, may be processed directly at the network level prior to subsequent routing to user computers 42-50 and other servers 56-66.

In any case, program code 43 conducting evaluative processes at the servers 56-66 may compare the extracted viral indicators conveyed within the metafile against stored criteria retrieved from one or more databases 68, 69 to determine an associated risk level. As such, the metafile is typically formatted at the client computer 42 level to accommodate program code 43 processing specifications. In this manner, the program code 43 may readily extract the viral indicator(s) and compare them to profile criteria recalled from an appropriate database(s) 68, 69. The program code 43 may process the criteria in conjunction with the sampled metafile information to determine if a match can be determined within predefined parameters.

Thus, program code 43 executed by the computer system 10 may utilize database 69 resources to assign appropriate risk levels to received data. In one embodiment, an evaluation process at the server 56 may comprise program code 43 correlating metafile entries to appropriate database fields. The fields, in turn, may link to risk levels. The program code 43 may ultimately tag the risk level assignments to the data from which the metafile is derived. An assignment of a risk level may function to alert a user and/or the network 36 as a whole as to the potential of a viral presence in the associated data. Other embodiments may further append a confidence rating to the risk level to convey some measure of the certainty of the assignment.

Figure 4:
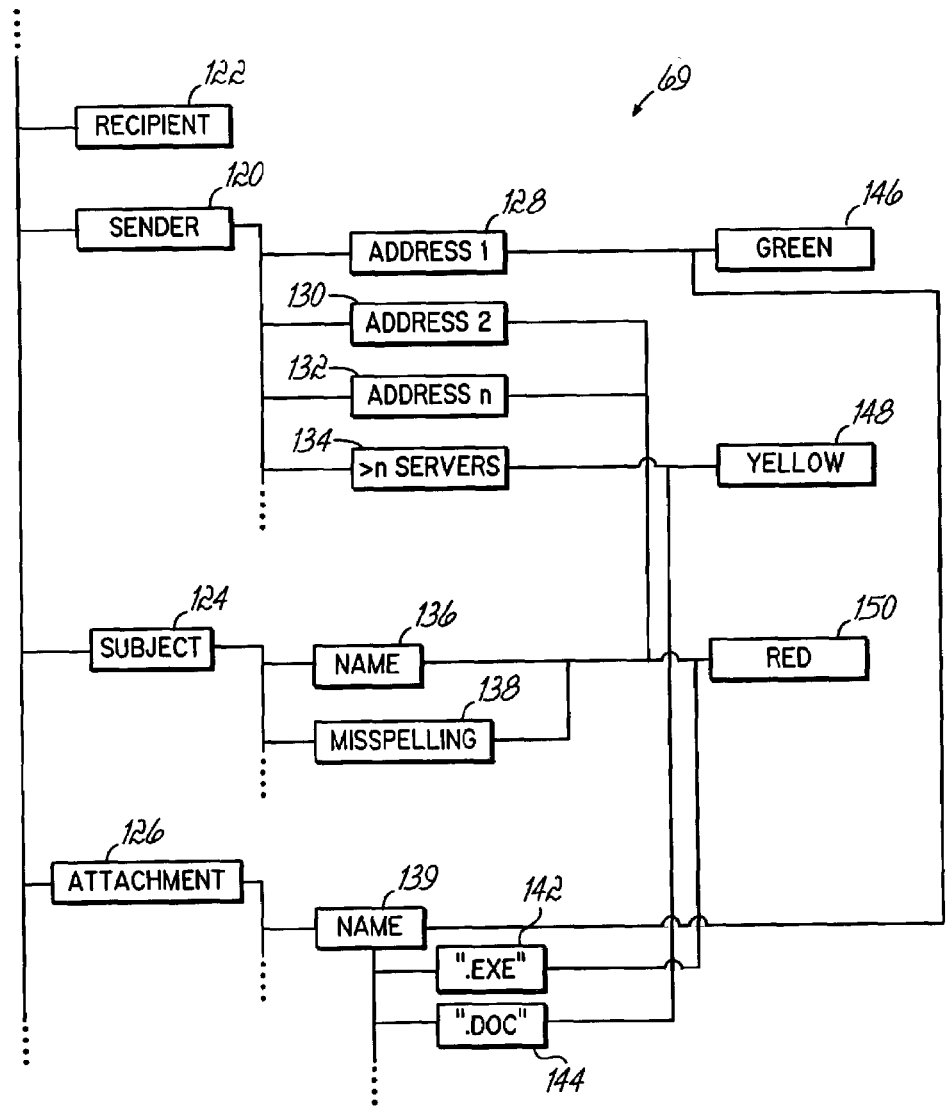
FIG. 4 is a database structure having application within the systems of FIGS. 1 and 2.

The assignment of a risk level to a database field, header data or other feature associated with the data may reflect an established probability of danger posed by the data to the system 40, or to a specific application within the system 40. The risk level may include an easily recognizable color scheme and/or be derived from a mathematical ratio, percentage or other value indicative of a correlation between the viral indicators and evaluative criteria contained within the databases 68, 69. For instance, the program code 43 may compare a network address of an electronic mail sender against a list of network addresses stored in appropriate fields 128-132 of the exemplary database 69 shown in FIG. 4. Should an address match between the metafile and the evaluative criteria 128-132 be established, an appropriate action may be initiated according to a database field 146IBM 150 linking to the located address field 130. For example, the linked database field 146150 may initiate program code 43 configured to tag or assign a risk level to the data from which the metafile was derived. As discussed herein, exemplary program code may assign a color, such as "red," 150 "yellow," 148 or "green" 146. Such a familiar color scheme may facilitate user recognition of a potential viral threat.

The database links may reflect concerns for certain preset viral indicators particular to a given system 40 or application. That is, risk levels and associated algorithm(s) may be linked or otherwise grouped in accordance with system policy. For instance, a viral indicator keyed on the arrival of a message in the system 10 received outside of normal working hours may warrant only a small level of risk, while a message routed through ten or more servers prior to arrival at the same system 10 may be assigned a high risk level. In this manner, program code 43 executing within the system 40 and typically executing at the server level may evaluate the respective risk levels in the context of system directives, tolerances, preferences and/or host requirements preset by a network administrator or system security manager.

As such, fields of the database 69 or other logical matrix may link respective risk levels to algorithms appropriate to process the data according to system specifications and prescribed antiviral actions. As discussed below in greater detail, exemplary algorithms may be suited to reroute, delete or buffer a transmission, as well as to query and/or notify a recipient at the user computer 42 or other network location. For example, the program code 43 may automatically tag and route the electronic data to a client, administrator, memory, etc., according to its risk level and an associated algorithm. Anther or the same embodiment may first generate a dialog box or other message on the computer monitor 22 of a client receiving incoming data.

Another notification generated in response to an evaluation may inform and/or request approval of a routing action corresponding to an appended risk level. For instance, a indicator field of an evaluated message may contain a color indicative of the assigned risk level. In another instance, an exemplary dialog box may notify a user, "Possible virus detected; routing to an administrator for evaluation." Other exemplary algorithms may be configured to delete, assess, modify, store, sanitize, scan, prompt, assign a confidence rating to the risk level, and/or detach portions of the original data transmission. Of note, the processing time required for the evaluation is typically imperceptible to a user by virtue of the relatively small size of the generated metafile. However, it should be understood that additional processors may be incorporated as desired per application specifications.

In practice, an exemplary risk level established for a given system 40 may regard a combination of viral indicators. For instance, a risk level may account for both the size of an attachment appended to an electronic message, as well as the time it was received. In one embodiment, the message may have to be received after local business hours to merit or prompt viral evaluation. Such evaluation may involve the program code 43 comparing the size of the data at the time it was received against tabled criteria defining different strata of message statistics and associated risk levels. For example, the size of the attachment may merit a risk level proportionally determined according to a single or range of stored byte sizes. In the exemplary application, at least a low risk level may attach to the message by virtue of the message being received after business hours. Of note, the same scenario in another network 36 may result in a higher or lower risk level, depending upon the environment and normal business practices of a host system 40.

In another embodiment, the server 56 may be postured to assign a first risk level to the data based on a first viral indicator, while a second server 62 may subsequently attach a second risk level based on another indicator scanned from the same metafile. Such a scenario may ultimately result in the higher risk level of the second server 62 overriding that of the first server 56. Thus, the higher risk level may be appended to the data. One embodiment may further assign a composite risk level based upon interaction between different indicators and/or assigned risk levels. In this manner, nearly any characteristics or circumstances regarding electronic data can be compared against any manner of registerable criteria in order to arrive at a suitable risk level and/or associated algorithm.

Of note, the central configuration of the server-based evaluation may further facilitate coordinated and uniform approaches to virus containment. As shown in FIG. 2, a network system 40 may link multiple user computers 42-46 to a single server 56 or cluster of servers 56-66. Postured as such within the network 36, the server(s) 56 may be configured to evaluate potential viral events occurring within the collective domain of all networked computers 42-50. That is, by virtue of the server(s)' 56 ordinary role as a hub and focal point within the network system 40, it presents a centralized platform from which to affect unilateral viral coverage. For instance, all data may be evaluated by the same program code 43 installed at or otherwise accessible to the server(s) 56.

The server(s) 56 may furthermore be postured to realize the evaluation and applicable algorithms using the most updated and appropriate antiviral resources. Such resources may include local and remote program code 43, as well as databases and other memory accessible to the server(s) 56. Of note, such resources may include all known antiviral programs. Thus, by virtue of the foregoing, an embodiment of the present invention may accommodate and actually enhance performance of conventional antiviral mechanisms. As such, the server 56 may be updated once for an entire network system 40 in accordance with the most recent antiviral software and other network specifications. Such specifications could include changing levels and requirements of security in the face of particular circumstances, such as a report of an imminent terrorist threat, or in consideration of a uniquely valuable network project. This feature contrasts prior art systems that require individual users or administrators to separately update computers subordinate to the server.

Of note, the data may be cached, stored or otherwise held in stasis prior and/or subsequent to evaluation at the server 56. In this manner, the system 40 may preserve the integrity of the data while the associated metafile undergoes evaluation. Additionally, the caching/sequestering feature of one embodiment may additionally function to confine a potential virus by preventing its propagation during identification.

Figures 5, 6:
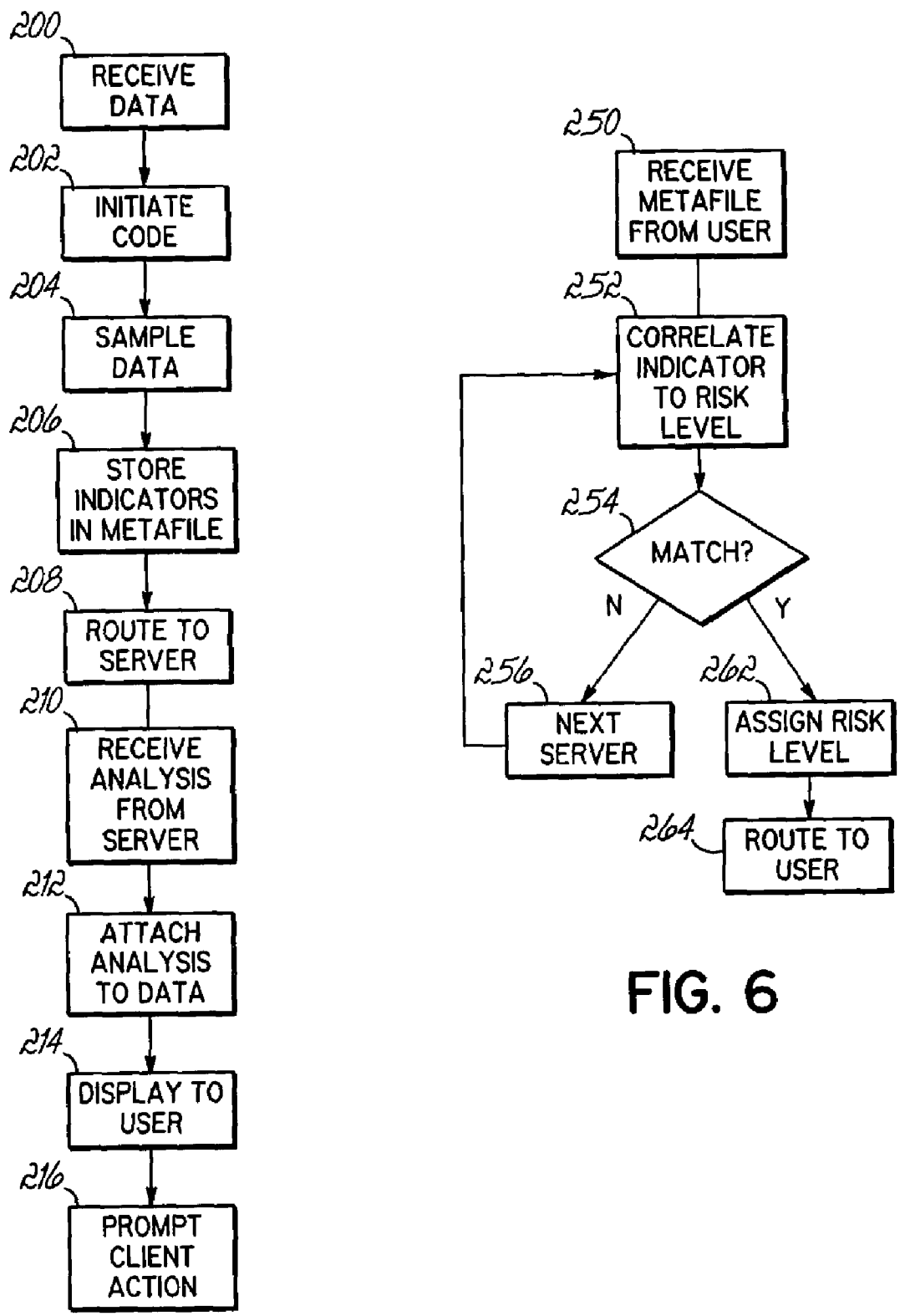
FIG. 5 is flowchart outlining method steps suited for execution at a client level within the systems of FIGS. 1 and 2.
FIG. 6 is flowchart outlining method steps complementing those of FIG. 5 and being suited for execution at a server level within the systems of FIGS. 1 and 2.

The flowchart of FIG. 5 illustrates exemplary sequence steps suitable for execution within any of the above described hardware environments of FIGS. 1 and 2. More particularly, the steps of the flowchart track processes that may occur at the local client computer level of a system 40. Those processes include generation and transmission of a metafile. Other steps include initiation of an action appropriate to a risk level that is subsequently assigned to the metafile/received data. Turning more particularly to the flowchart, transmitted data may arrive at a networked computer 30 at block 200. For purposes of the illustrated embodiment, the networked computer 42 may comprise either or both a client and server computer. The data may enter the computer 42 via its disk interface 23 or through a browser interfacing the Internet, intranets or some other remote site within, or otherwise accessible to the user network 40. In one embodiment, reception of the data at block 200 may initiate antiviral processes at block 202. Another or the same embodiment may initiate the same processes in response to unusual processing time associated with data already on the computer 42.

Program code 41 resident at the computer 42 may sample information from the data at block 204. Such information may relate to contextual circumstances surrounding the data's entry into the network 40, such as its routing path, time of transmission, originator and distribution count. Other information may relate to a data pattern, such as a code sequence, checksum value, format and protocol, as well as the size of the data, among other parameters. In fact, one skilled in the art should appreciate that the information gleaned from the data may comprise any registerable attribute concerning the context surrounding and/or actual data, itself.

In one embodiment, an indicator may correspond to criteria preset by a network administrator or recalled from a profile. For instance, statistics used to build criteria of a user profile may include a bell curve or other analysis describing historical or normal practices of the user. For example, criteria populating a profile may reflect that the associated user(s) sends 95% of his or her electronic transmissions between 7:00 a.m. and 5:30 p.m. in the course of normal business operations. Should the viral indicators identified from the metafile indicate that the time of transmission of the evaluated data falls outside preset parameters (e.g., $95^{th}$ percentile) of a statistical bell curve, the program code 43 may initiate an algorithm configured to alert or otherwise protect the user.

At block 206, program code 41 may initiate generation of a metafile communicative of one or more such viral indicators. Of note, the type of information designated to be in a file may vary per network and/or user. For example, a given network system 40 may concern itself particularly with distribution count. Distribution count concerns the number of client computers designated by an electronic transmission. As such, computers 12, 14, 20 of the network 36 may sample distribution count information from the data for inclusion in the file sent to the server 16 for evaluation.

Other data included in an exemplary file may concern and/or be prompted by a user profile. Such a profile may dictate what parameters of the data should be evaluated and included within the metafile. User profile criteria may be stored on the client computer 30 or somewhere else within the system 40 and may regard a historical accounting of data processing for the user, among other user attributes. For instance, profile criteria may include the hours of a day in which the user normally accesses the a network. Such criteria may be helpful in identifying operating aberrations and other unusual circumstances that sometimes accompany viral activity. Other evaluative criteria conveyed within a profile may concern activity considered extraordinary for the user with regard to a particular program application. As above, suitable profile data may include relationships between a combination of the application criteria and temporal norms. In this manner, the program code 41 may construct the profile used to generate the file according to specifications tailored to an individual user, team or other grouping of network users. Where desired, generation of the file at block 206 may be automatic and transparent to the user. Moreover, a system 10 may offer a user a disable function configured to inhibit antiviral evaluation on an application specific basis. Such a disable function may act to override or otherwise halt generation of the file at block 206.

At block 208, the metafile may be automatically routed to the server 56. Of note, such action may be unnecessary where the file is generated at a computer 30 comprising the server 56. For purposes of the present invention, a server 56 may include any controller or combination of controllers configured to route data between multiple users, to include firewall processes. The file transfer of block 208 may be instantaneous, and involve dedicated and/or compartmentalized processors configured to isolate and evaluate multiple files. As with the processes responsible for generation of the file at block 206, those concerning its transfer to the server 56 are typically accomplished in a manner that is transparent and otherwise imperceptible to the user.

As discussed herein, the server 56 may evaluate the metafile in response to the transmission of block 208. Such evaluation processes may include the assignment of a risk level to the metafile/data. Other evaluation processes may include instructions for execution by the local computer 30, such as caching the received data. In any case, the computer 42 may receive the results of the evaluation at block 210. Where the evaluation produces a tag or other marking, such as a color indicator, that computer 42 may attach or otherwise correlate the color to the data at block 212. That is, the color may be integrated with a template 100 or other programmatic structure conveying the data to a user. Another or the same embodiment may insert identifying code within header code of the data. In this manner, results of the evaluation at the server 56 can be preserved as the data subsequently disseminates throughout the network system 40.

At block 214, such a designator may ultimately be displayed to the user at their terminal. For instance, an inbox, or other displayed listing of received electronic messages available the user may include a portion highlighted in a designated color. The color may communicate a risk level assigned to the message by a server 56. As such, a message deemed to be high risk at block 210 may have a red background when displayed to the user at block 214. The user may decide what should be done with the message at block 216. That is, the user may elect to delete it, route it to an administrator for further analysis, or even open only portions of the message, e.g., all but an attachment. Thus, in one embodiment, a user ultimately decides at block 216 what action to take with regard to received data and associated risk levels.

In other instances, a network may be configured to automatically take action at block 216. For instance, one embodiment may buffer or otherwise store the data in response to a high risk level. Storage of the data may be accomplished locally or at the server level according to processing and memory considerations. Caching or storage of the data in short term memory may facilitate subsequent routing and analysis of suspect data should the presence of a virus be detected. The storage may additionally function to preserve an uncorrupted copy of the data even where no virus is detected. Thus, the buffering may effectively hold the data in stasis while antiviral analysis (such as file generation and evaluation) is undertaken. To this end, one skilled in the art should appreciate that caching processes could be accomplished at multiple additional or alterative points along the steps of the flowchart of FIG. 5.

The flowchart of FIG. 6 illustrates sequenced steps configured to execute within the hardware environments of FIGS. 1 and 2, as well as to particularly complement those client level processes of FIG. 5. That is, FIG. 6 includes processes suited to analyze metafile data received at the server level. More particularly, a server 56 may receive a metafile at block 250. Program code 43 at the server 56 may evaluate the metafile for viral potential at block 252. That is, program code 43 may sample or otherwise identify a viral indicator associated with the metafile. The indicator may be used to determine a level of risk. In one embodiment, program code 43 may compare the sampled viral indicator against profile criteria accessed from a database 69. Should a match be established at block 254, program code may assign a risk level or initiate another action linked to a correlated field of the database 69 at block 262.

Where a match between a viral indicator and a profile criterion cannot be established at block 254, then the metafile containing the viral indicator may be routed to another server 62 at block 256. Program code at that server 62 may then evaluate the content of the metafile against another database 68 or other resource to ascertain if a match can be made, and a viral indicator be subsequently assessed. One of skill in the art will appreciate that tiers of such servers may be configured to hierarchically evaluate different strata of viral indicators. One such server 66 may store a metafile and associated data until a personal assessment is possible by an administrator at some later time. Another or the same embodiment may assign a risk level indicating to the user an inability to evaluate a certain viral indicator. For instance, an electronic mail user may read, "message undergoing viral evaluation" in their inbox interface listing, while an associated metafile evaluates further scrutiny.

Where a correlation or comparable identification process is achieved at block 254, then program code 43 may assign a risk level to the data based upon one or more of the viral indicators of the metafile at block 262. As discussed above, the risk level may take the form of a color, percentage, scaled score or other indicator suited to communicate to the user the potential of the data harboring a virus. As such, the assignment may be transmitted back to the client computer at block 264, where it may be programmatically associated with the data and displayed to the user.

While a user typically selects an action appropriate to an assigned risk level, one of skill in the art will appreciate that other embodiments may initiate such actions at the server level. For instance, program code 43 at the server may automatically initiate an electronic message, such as a dialog box on a display of an administrator or system manager. Other exemplary algorithms recalled and executed by the server 56 in response to the evaluation of block 252 may reroute data of an incoming message to an analysis center to store aspects of it for later study. Still other algorithms appropriate to the information and/or assigned risk level may modify or sanitize an identified and known virus. Suitable algorithms may sequester use of the account, server 16 or other source of a potential virus. An appropriate algorithm may initiate an e-mail transmission to the client computer 42, prompting more information required to identify and/or defeat a potential virus. Moreover, other hybrid embodiments may include actions at both the server and client levels.

Thus, benefits of one embodiment consistent with the principles of the present invention may include a centralized antiviral process that ensures that the most up-to-date antiviral algorithms are applied to all data processed within a network system 40. Personnel may be relieved of the burden of updating individual client computers by virtue of a single administrator maintaining one set of antiviral software on a single or relatively small cluster of servers. Among other benefits of an embodiment of the present invention, viruses may be readily contained and processed for study and identification, while further spread is contained.

One skilled in the art should appreciate that the steps illustrated in the flowcharts of FIGS. 6 and 7 are ordered as shown for illustrative purposes and should not be construed in any way to limit the sequence that the same or equivalent steps can be executed in accordance with the underlying principles of the present invention. For instance, one embodiment may vary the order that database criteria is retrieved in relation to generation of the metafile. In this manner, metafile generation processes may or may not account for the profile criteria, which may exclusively have application in subsequent file evaluation processes. Another embodiment may use the profile criteria to steer generation of the file by focusing on information relating to the applicable profile criteria.

Thus, while the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for a networked system comprising a plurality of tiered servers at a network level in communication with a network client, wherein the networked system includes a database used to evaluate data for the presence of a virus, comprising:

receiving in a first tiered server a metafile associated with data received by a network client;

evaluating in the first tiered server the metafile for a potential viral presence by correlating the metafile to fields within the database;

routing at least a portion of the metafile from the first tiered server to a second tiered server disposed in a higher level tier than the first tiered server to further evaluate the metafile by correlating the portion of the metafile to at least one additional field within the database; and assigning to the data a risk level from among a plurality of risk levels stored within the database, wherein the assigned risk level is indicative of the potential viral presence.

2. The method according to claim 1, further comprising generating the metafile at the network client.

3. The method according to claim 1, wherein receiving the metafile in the first tiered server further comprises routing the metafile to the first tiered server from the network client.

4. The method according to claim 1, wherein evaluating the metafile further comprises determining a parameter selected from a group consisting of: transmission parameters, code sequence, user profile data, download mechanism and time, processing requirements, time criteria, sender attributes, receiver attributes, hardware utilized, routing path, originator data, distribution count, user history, data pattern, checksum value, data analysis, attachment, number sent, file size, format, protocol and some combination thereof.

5. The method according to claim 1, further comprising initiating an antiviral operation including selecting an algorithm selected from a group consisting of: deleting, routing, tagging, notifying, assessing, modifying, storing, sanitizing, scanning, prompting, assigning confidence level, detaching and some combination thereof.

6. The method according to claim 1, wherein evaluating the metafile further includes comparing content of the metafile to a criterion recalled from memory.

7. The method according to claim 1, wherein evaluating the metafile further comprises generating a profile having an evaluative criterion for a user.

8. The method according to clam 1, further comprising storing the metafile.

9. The method according to clam 1, further comprising storing the data.

10. The method according to claim 1, further comprising displaying the assigned risk level to a user to enable the user to consider the potential presence of the virus.

11. The method according to claim 1, wherein assigning the risk level further comprises assigning a color associated with the risk level to the data, and displaying the color to a user to enable the user to consider the potential presence of the virus.

12. The method according to claim 1, wherein the metafile is associated with an electronic mail transmission for the network client, the metafile including attachment data associated with an attachment to the electronic mail transmission, sender data associated with a routing history for the electronic mail transmission, and textual data sampled from the electronic mail transmission, wherein the networked system is configured to evaluate the attachment data, the sender data and the textual data from the metafile in at least two tiered servers among the plurality of tiered servers.

13. The method according to clam 2, wherein generating the metafile further comprises including at least a portion of the data in the metafile.

14. The method according to claim 7, wherein generating the profile further comprises selecting the criterion from a group consisting of: a preference, historical data, system policy, transmission and download conventions, routing norms, average processing requirements, distribution patterns, a recognizable checksum value, attachment information, file size, a format, a protocol and some combination thereof.

15. The method according to claim 7, wherein evaluating the metafile further comprises storing the profile.

* * * * *